(12) United States Patent
Shelley et al.

(10) Patent No.: US 8,056,342 B2
(45) Date of Patent: Nov. 15, 2011

(54) HOLE PATTERN FOR GAS TURBINE COMBUSTOR

(75) Inventors: Jonathan K. Shelley, Menan, ID (US); Albert K. Cheung, East Hampton, CT (US); Steven W. Burd, Cheshire, CT (US); Stuart L. Kozola, Plainville, MA (US)

(73) Assignee: United Technologies Corporation, Hartford, CT (US)

( * ) Notice: Subject to any disclaimer, the term of this patent is extended or adjusted under 35 U.S.C. 154(b) by 721 days.

(21) Appl. No.: 12/137,580

(22) Filed: Jun. 12, 2008

(65) Prior Publication Data

US 2009/0308077 A1 Dec. 17, 2009

(51) Int. Cl.
*F23R 3/04* (2006.01)
(52) U.S. Cl. ............... 60/752; 60/754; 60/758; 60/760; 60/766
(58) Field of Classification Search ............... 60/752, 60/754, 766, 758, 753, 760
See application file for complete search history.

(56) References Cited

U.S. PATENT DOCUMENTS

| | | | |
|---|---|---|---|
| 4,302,941 A | 12/1981 | DuBell | |
| 5,479,772 A | 1/1996 | Halila | |
| 5,479,782 A | 1/1996 | Parker | |
| 5,758,503 A | 6/1998 | DuBell | |
| 6,260,359 B1 * | 7/2001 | Monty et al. | 60/752 |
| 6,401,447 B1 | 6/2002 | Rice | |
| 6,606,861 B2 | 8/2003 | Snyder | |
| 6,655,149 B2 * | 12/2003 | Farmer et al. | 60/754 |
| 6,675,587 B2 | 1/2004 | Graves | |
| 6,810,673 B2 | 11/2004 | Snyder | |
| 7,093,439 B2 | 8/2006 | Pacheco-Tougas | |
| 7,140,185 B2 * | 11/2006 | Burd | 60/752 |
| 2006/0130486 A1 | 6/2006 | Danis | |
| 2007/0169484 A1 | 7/2007 | Schumacher | |

* cited by examiner

*Primary Examiner* — Ehud Gartenberg
*Assistant Examiner* — Steven Sutherland
(74) *Attorney, Agent, or Firm* — Carlson, Gaskey & Olds, PC (57) ABSTRACT

A combustor for a turbine engine includes an outer liner having a row of circumferentially distributed outer combustion air holes and an inner liner circumscribed by the outer liner and having a row of circumferentially distributed inner combustion air holes. The inner and outer liners each include at least a major air hole having a first hole size, an intermediate air hole having a second hole size, and a minor air hole having a third hole size. The first, second, and third hole sizes are all different from each other.

19 Claims, 4 Drawing Sheets

FIG.1

HOLE PATTERN FOR GAS TURBINE COMBUSTOR

BACKGROUND OF THE INVENTION

This disclosure relates to a combustor for a gas turbine engine and, more particularly, to a hole pattern formed in inner and outer combustor liners.

Gas turbine engines, such as those used to power modern commercial and military aircraft, include a compressor for pressurizing a supply of air, a combustor for burning a hydrocarbon fuel in the presence of the pressurized air, and a turbine for extracting energy from the resultant combustion gases. The combustor generally includes radially spaced apart inner and outer liners that define an annular combustion chamber therebetween. Arrays of circumferentially distributed combustion air holes penetrate multiple axial locations along each liner to radially admit the pressurized air into the combustion chamber. A plurality of circumferentially distributed fuel injectors project into the forward end of the combustion chamber to supply the fuel for mixing with the pressurized air.

Combustion of the hydrocarbon fuel in the presence of pressurized air is know to produce a number of pollutants including nitrogen oxide ($NO_X$) emissions that are subjected to stringent controls by regulatory authorities, and thus are sought to be minimized as much as possible.

At least one known strategy for minimizing $NO_X$ emissions is referred to as rich burn, quick quench, lean burn (RQL) combustion. The RQL strategy recognizes that the conditions for $NO_X$ formation are most favorable at elevated combustion flame temperatures, such as when a fuel-air ratio is at or near stoichiometric, for example. A combustor configured for RQL combustion includes three serially arranged combustion zones: a rich burn zone at the forward end of the combustor, a quench or dilution zone axially aft of the rich burn zone, and a lean burn zone axially aft of the quench zone.

During engine operation, a portion of the pressurized air discharged from the compressor enters the rich burn zone of the combustion chamber. Concurrently, the fuel injectors introduce a stoichiometrically excessive quantity of fuel into the rich burn zone. Although the resulting stoichiometrically fuel rich fuel-air mixture is ignited and burned to partially release the energy content of the fuel $NO_X$ formation may still occur.

The fuel rich combustion products then enter the quench zone where jets of pressurized air radially enter through combustion air holes from the compressor enter to the quench zone of the combustion chamber. The pressurized air mixes with the combustion products to support further combustion of the fuel with air by progressively deriching the fuel rich combustion products as they flow axially through the quench zone and mix with the air. Initially, the fuel-air ratio of the combustion products changes from fuel rich to stoichiometric, causing an attendant rise in the combustion flame temperature. Since the quantity of $NO_X$ produced in a given time interval is known to increase exponentially with flame temperature, substantial quantities of $NO_X$ may be produced during the initial quench process. As the quenching continues, the fuel-air ratio of the combustion products changes from stoichiometric to fuel lean, causing an attendant reduction in the flame temperature. However, until the mixture is diluted to a fuel-air ratio substantially lower than stoichiometric, the flame temperature remains high enough to generate considerable quantities of $NO_X$.

Finally, the derichted combustion products from the quench zone flow axially into the lean burn zone. Additional pressurized air in this zone supports ongoing combustion to release energy from the fuel. The additional pressurized air in this zone also regulates the peak temperature and spatial temperature profile of the combustion products in attempts to reduce turbine exposure to excessive temperatures and excessive temperature gradients.

One known example pattern of combustion air holes in the inner and outer liners includes a series of holes that have two different sizes, i.e. a major hole and a minor hole. The pattern includes a major hole diameter and a minor hole diameter that alternate with each other. A minor hole on one of the inner and outer liners is radially aligned in a major hole of the other of the inner outer liners. This alternating pattern continues about a circumference of each of the inner and outer liners. While this pattern has been effective in reducing $NO_X$ emissions, still greater improvement is desired as environmental regulations become increasingly more strict with regard to such emissions.

SUMMARY OF THE INVENTION

A combustor for a turbine engine includes an outer liner and an inner liner circumscribed by the outer liner. The outer liner has a row of circumferentially distributed outer combustion air holes and the inner liner has a row of circumferentially distributed inner combustion air holes. The inner and outer liners each include at least a major air hole having a first air hole size, an intermediate air hole having a second air hole size, and a minor air hole having a third air hole size. The first, second, and third air hole sizes are all different from each other for a respective liner.

In one example, the intermediate air holes are larger than the minor air holes and smaller than the major air holes.

In one example, the intermediate air hole is positioned circumferentially between the major and minor air holes.

In one example, the outer liner includes an additional outer air hole and the inner liner includes an additional inner air hole to form a four hole pattern. The additional air holes each comprise one of a major air hole, an intermediate air hole, or a minor air hole.

In one example, the major air hole from the inner liner is at least partially aligned in a radial direction with one of the minor or intermediate air holes from the outer liner.

In one example, the row of circumferentially distributed outer combustion air holes are comprised of a plurality of first hole sets that are circumferentially spaced apart from each other. Each first hole set includes at least one major air hole, one intermediate air hole, and one minor air hole. In another example configuration, each first hole set includes the additional air hole. The row of circumferentially distributed inner combustion air holes are comprised of a plurality of second hole sets that are circumferentially spaced apart from each other. Each second hole set includes at least one major air hole, one intermediate air hole, and one minor air hole. In another example configuration, each second hole set includes the additional intermediate air hole.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
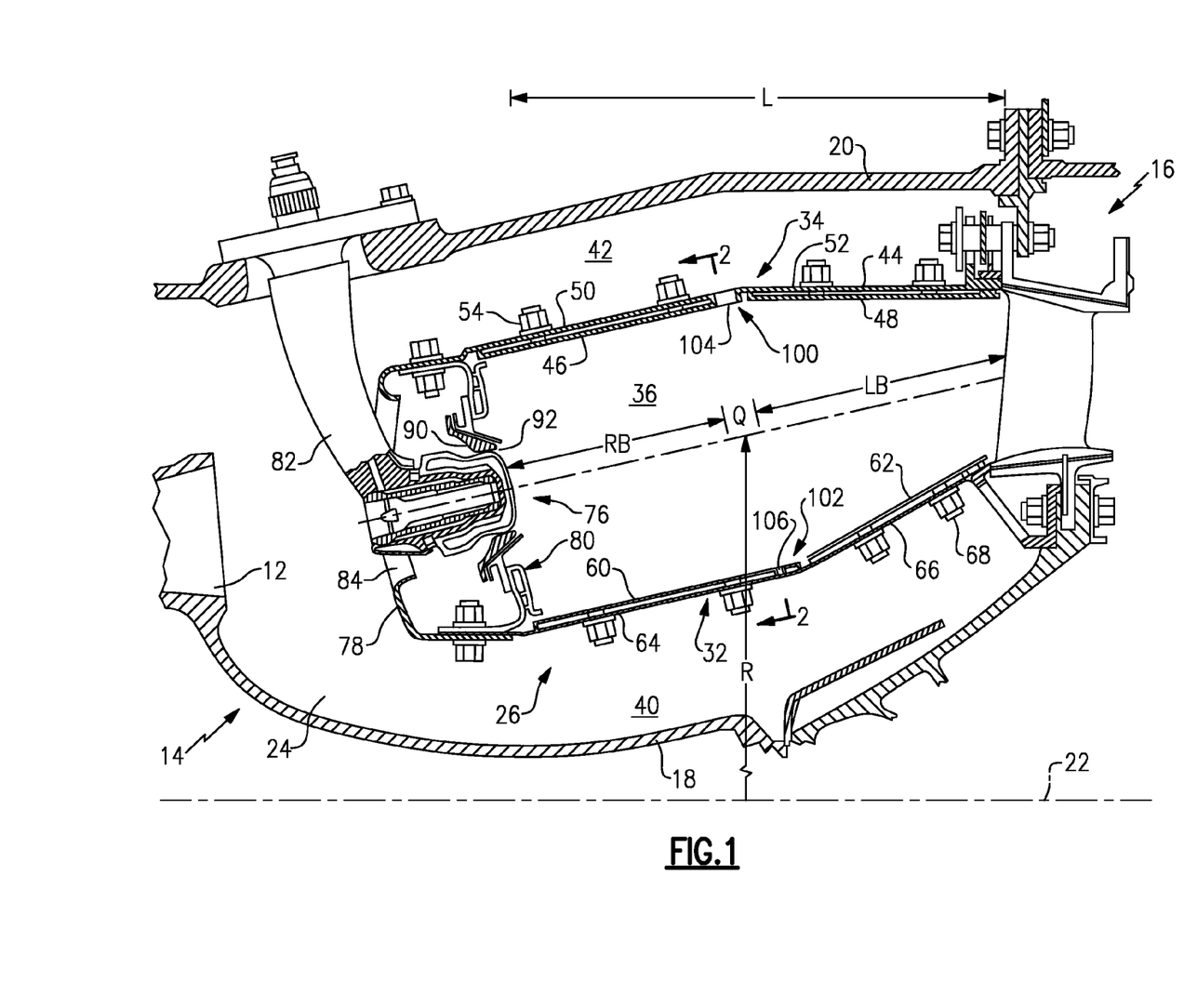
FIG. 1 is a cross-sectional side elevation view of a combustor.

A gas turbine engine includes a compressor (not shown), a diffuser 12 (partially shown), a combustor module 14, and a turbine module 16 (partially shown). The combustor module 14 comprises a radially inner case 18 and a radially outer case 20, concentric with the radially inner case 18. The radially inner 18 and outer 20 cases circumscribe an axially extending engine centerline 22 to define an annular pressure vessel 24. The combustor module 14 also includes a combustor 26 residing within the annular pressure vessel 24. The combustor 26 includes a liner assembly comprising a radially inner liner 32 and a radially outer liner 34 that circumscribes the radially inner liner 32 to define an annular combustion chamber 36. The inner 32 and outer 34 liners cooperate with the inner 18 and outer 20 cases to define respective inner 40 and outer 42 air plenums.

In the example shown, the outer liner 34 comprises a single piece outer support shell 44 connected to the outer case 20, and forward and aft outer heatshields 46, 48 secured by fasteners 54 to respective forward 50 and aft 52 portions of the outer support shell 44. As seen best in the example of FIG. 2, each outer heatshield 46, 48 comprises nine arcuate heatshield panels, such as representative panels 46a which each define an arc segment.

Similarly, the inner liner 32 comprises a single piece inner support shell 58 connected to the inner case 18, and forward 60 and aft 62 inner heatshields are secured by fasteners 68 to respective forward and aft portions 64, 66 of the inner support shell 58. As seen best in FIG. 2 each inner heatshield 60, 62 comprises nine arcuate heatshield panels, such as panels 60a which each define an arc segment. Each inner and outer heatshield can subtend an arc of approximately 20-45 degrees. The radial separation between each shell and its respective heatshield panels is slightly exaggerated in FIG. 2 for clarity purposes.

A plurality of axially and circumferentially distributed cooling air holes perforates the inner and outer liners. These cooling air holes, which are depicted only in FIGS. 3A and 3B, include a plurality of impingement cooling holes 70 penetrating transversely through the outer 44 and inner 58 support shells, and a plurality of film cooling holes 72 penetrating obliquely through the heatshields 46, 48, 60, 62. The cooling air holes 70, 72 are readily distinguishable from combustion air holes described hereinafter because the cooling air holes 70, 72 are far more numerous and substantially smaller than the combustion air holes. For example, the combustor 26 has a total of approximately 23,000 impingement holes, each about 0.64 millimeters (0.025 inches) in diameter, and a total of approximately 46,000 film cooling holes, each about 0.64 millimeters (0.025 inches) in diameter in the combustor 26 that includes thirty-six heatshield panels. Moreover, as described below, the cooling air discharged through the film cooling holes 72 hugs the heatshield panels to form a cooling film rather than penetrating into the interior of the combustion chamber 36 and participating in the combustion process.

Figure 3A:
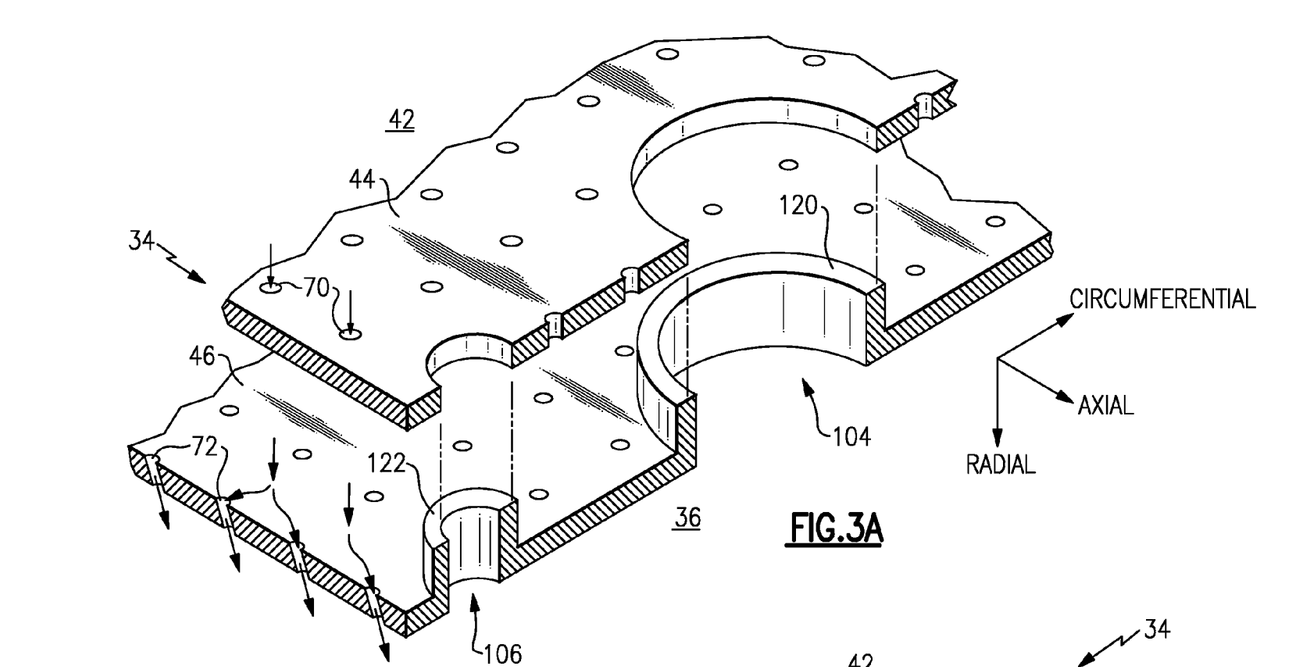
FIG. 3A is an exploded, enlarged perspective view of a portion of the combustor shown in FIG. 1.
Figure 3B:
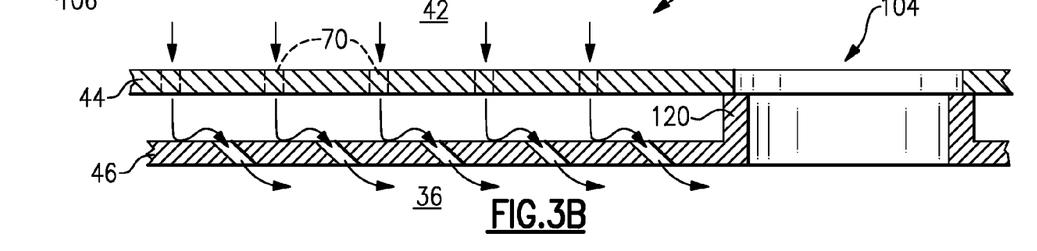
FIG. 3B is an enlarged side elevation view of a portion of the combustor shown in FIG. 1.

During engine operation, pressurized cooling air from the plenums 40, 42 enters the impingement cooling holes 70. The cooling air exits the impingement cooling holes 70 as a first series of discrete jets that impinge on and cool the heatshields 46, 48. The impinged cooling air then flows through the film cooling holes 72, which discharge a second series of cooling air jets into the combustion chamber 36. Because the film cooling holes 72 are obliquely oriented, the second cooling air jets enter the combustion chamber 36 with a directional component that parallels the flame exposed surface of each heatshield. The parallelism helps the cooling air jets coalesce into a cooling film that hugs the flame exposed surfaces of the heatshields 46, 48. The illustrated film cooling holes 72 are oriented so that the cooling air discharged therefrom has both radial and axial directional components, however, the film cooling holes 72 may be oriented so that the discharged cooling air has a circumferential directional component as well. Additional disclosure regarding a similar shell and panel arrangement is contained in U.S. Pat. No. 5,758,503, the contents of which are incorporated herein by reference.

As shown in FIG. 1, the combustor 26 also includes a front end assembly 76 comprising an annularly extending hood 78, a bulkhead assembly 80, eighteen fuel injectors 82 and eighteen fuel injector guides 90 that each has a center opening 92. The hood 78 extends radially between, and is secured to, the forwardmost ends of the inner and outer liners 32, 34. In this example, the hood 78 includes eighteen circumferentially distributed hood ports 84 that accommodate the fuel injectors 82 and introduce air into the forward end of the combustion chamber 36. Each fuel injector 82 is secured to the outer case and projects through one of the hood ports 84 and through the central opening 92 in the corresponding fuel injector guide 90. The front end assembly 76 is the exclusive vehicle for introducing primary combustion air into the forward end of the combustion chamber 36. Additional disclosure regarding the structure of the bulkhead assembly, fuel injectors, air swirlers, and associated cooling passages is contained in U.S. Pat. No. 6,606,861, the contents of which are incorporated herein by reference.

Figure 2:
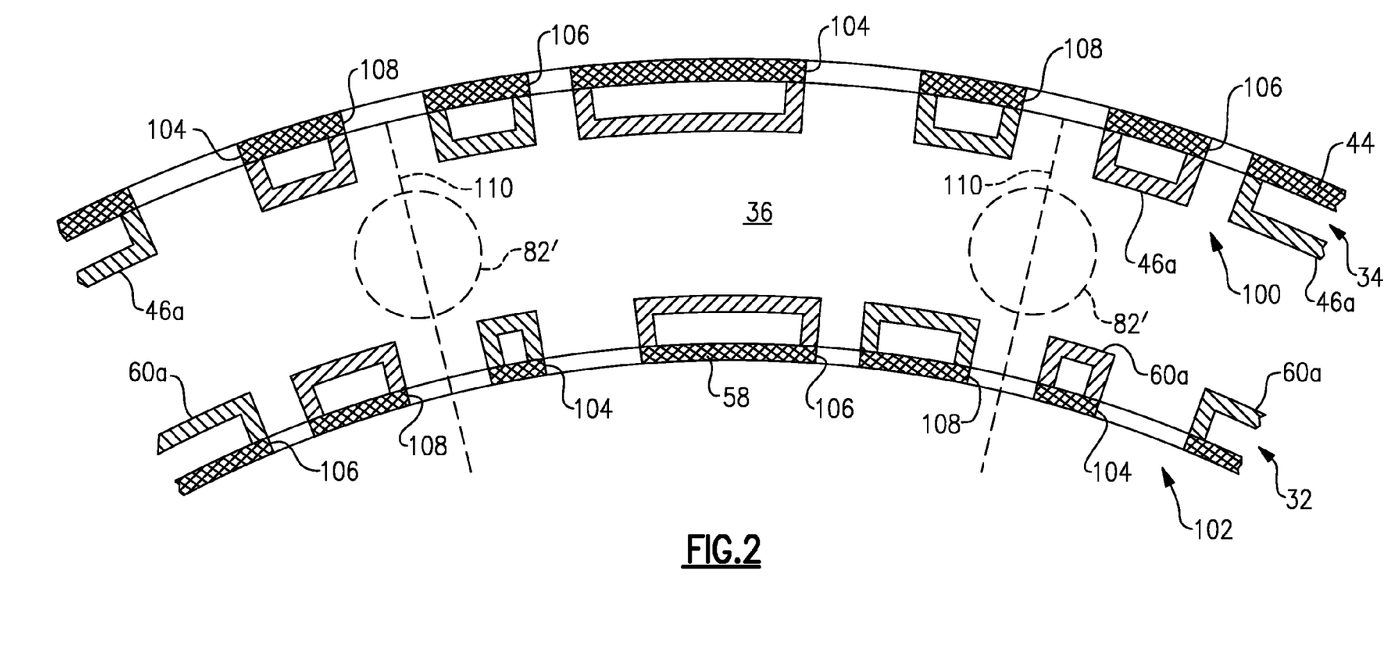
FIG. 2 is a view taken substantially in the direction 2-2 of FIG. 1.

As shown in FIGS. 1 and 2, the outer 34 and inner 32 liners each have a row 100, 102 of circumferentially distributed combustion air admission holes penetrating therethrough. The outer row 100 of combustion air holes in the outer liner 34 is comprised of a set of collective patterns that are arranged in repeating order about a circumference of the outer liner. The pattern includes at least three combustion air holes, and in one example includes four combustion air holes. In one example, each pattern is aligned with one of the fuel injectors 82, thus, the number of patterns through the liners is commensurate with the number of fuel nozzles.

Figure 4A:
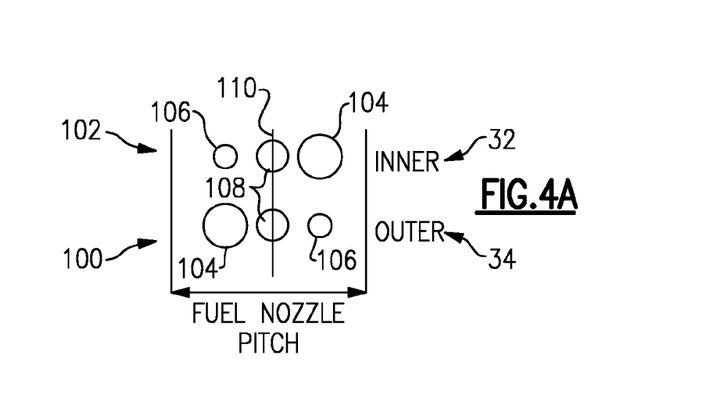
FIG. 4A is a schematic representation of one example hole pattern.

When a three hole pattern is used, as shown in FIGS. 2 and 4A, the three combustion air holes have hole sizes that are different from each other. For example, the outer liner 34 includes a major air hole 104, a minor air hole 106 that is smaller than the major air hole 104, and an intermediate air hole 108 that is smaller than the major air hole 104 and larger than the minor air hole 106.

The inner liner 32 in this example is similarly configured to include a major air hole 104, a minor air hole 106 that is smaller than the major air hole 104, and an intermediate air hole 108 that is smaller than the major air hole 104 and larger than the minor air hole 106. The intermediate air holes 108 are positioned circumferentially between the major air holes 104 and the minor air holes 106.

The outer row 100 of circumferentially distributed outer combustion air holes includes a plurality of first hole sets, with each first hole set comprising the three air hole pattern. Thus, each first hole set includes one minor air hole 106 that is circumferentially spaced from one intermediate air hole 108, which is circumferentially spaced from one major air hole 104. Each minor hole 106 of one first hole set is circumferentially spaced from a major air hole 104 of an immediately adjacent first hole set. Thus, the outer row 100 of circumferentially distributed outer combustion air holes has the pattern of one minor air hole 106, followed by one intermediate air hole 108, followed by one major air hole 104, followed by one minor air hole 106, followed by one intermediate air hole 108, etc.

The inner row 102 of circumferentially distributed inner combustion air holes includes a plurality of second hole sets, with each second hole set comprising the three air hole pattern. The three hole pattern is similar to that described above and includes one minor air hole 106 that is circumferentially spaced from one intermediate air hole 108, which is circumferentially spaced from one major air hole 104. Each minor hole 106 of one second hole set is circumferentially spaced from a major air hole 104 of an immediately adjacent second hole set.

The air holes from the first hole set are at least partially radially aligned with some air holes from the second hole set. In the graphical example shown in FIG. 4A, a minor air hole 106 from the first hole set of the outer row 100 is at least partially radially aligned with a major air hole 104 from the second hole set of the inner row 102. The intermediate air hole 108 from the first hole set of the outer row 100 is at least partially radially aligned with the intermediate air hole 108 from the second hole set for the inner row 102. The major air hole 104 from the first hole set for the outer row 100 is at least partially radially aligned with the minor air hole 106 from the second hole set for the inner row 102. A fuel nozzle position relative to the pattern is indicated at 110. In the example shown, the fuel nozzle position 110 is generally aligned with the intermediate holes 108 of the three hole pattern.

Figure 4B:
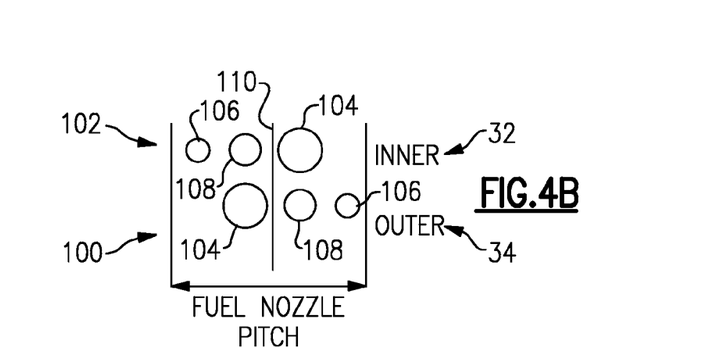
FIG. 4B is a schematic representative of another example hole pattern.

In another example of a three hole pattern shown in FIG. 4B, the major air hole 104 from the first hole set of the outer row 100 is at least partially radially aligned with an intermediate air hole 108 from the second hole set of the inner row 102. The intermediate air hole 108 from the first hole set of the outer row 100 is at least partially radially aligned with the major air hole 104 from the second hole set of the inner liner 102. A minor air hole 106 from the first hole set of the outer row 100 is offset from a minor air hole 106 from the second hole set of the inner row 102, with the intermediate 108 and major 104 air holes of the first and the second hole sets being positioned circumferentially between the minor air holes 106 of the first and the second hole sets. In other words, in this example, the minor air holes 106 are not radially aligned with each other, and are not radially aligned with the intermediate 108 or major 104 air holes. The fuel nozzle position 110 in this example is not aligned with any of the air holes but is positioned between the major 104 and intermediate 108 air holes of each of the first and second hole sets.

The holes in each of the rows 100, 102 serve to regulate the quantity of combustion air admitted into the combustion chamber 36. In the three hole pattern, the major air holes 104 are circumferentially positioned proximate to regions of strong swirl approaching the quench row. Placement of the intermediate 108, 112 and minor 106 air holes in the outer 34 and inner 32 liners is managed and prescribed to impact the less prominent fuel/swirl regions while still promoting effective mixing of the pressurized air with the upstream fuel-air mixture and at pressurized air levels that secure the design intent and respective air flow requirements/restrictions. As air swirlers at the front end of the combustor impose a specific and distinct swirl (clockwise or counterclockwise), the patterns of the air holes in the inner 32 and outer 34 liners are mirror opposites, with the major air holes 104 positioned in the areas of strongest swirl proximate to the liner or in regions where the front end swirl drives flow towards the liner.

Figure 5A:
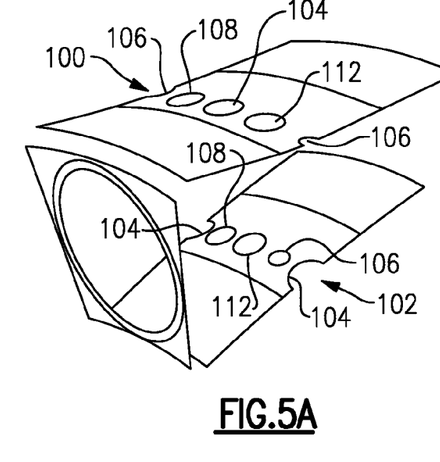
FIG. 5A is a perspective schematic representation of inner and outer liners with one example of a hole pattern.
Figure 5B:
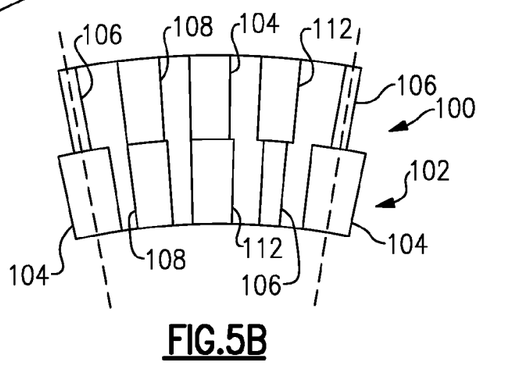
FIG. 5B is a schematic comparison of radially aligned holes from FIG. 5A.

FIGS. 5A-5B show an example of a four hole pattern. The four hole pattern circumferentially repeats for both rows 100, 102 in the manner described above with regard to the three hole pattern. The only difference is that there is an additional, i.e. a fourth combustion air hole. The fourth outer air hole includes an additional intermediate air hole 112 that is larger than the minor air holes 106 and smaller than the major air holes 104. Thus, there are two intermediate air holes 108, 112 in the four hole pattern. In the example shown, the intermediate air holes 108, 112 have different sizes from each other; however, the intermediate air holes 108, 112 could be of similar or equal sizes.

The intermediate air holes 108, 112 are positioned circumferentially between the major air holes 104 and the minor air holes 106 in each of the rows 100, 102. As such, the outer row 100 of circumferentially distributed outer combustion air holes is comprised of a plurality of first hole sets. Each first hole set includes one minor air hole 106 that is circumferentially spaced from at least one of an intermediate air hole 108 and a major air hole 104. The intermediate air holes 108, 112 may be positioned adjacent to each other circumferentially between a major air hole 104 and a minor air hole 106 (see inner row 102 of FIG. 5B), or can be positioned on circumferentially opposing sides of a major air hole as shown for the outer row 100 in FIG. 5B. Each four hole pattern then repeats circumferentially about the inner and outer liners.

In this example, air holes from the first and second hole sets are also radially aligned in a pattern. As best shown in FIG. 5B, a minor air hole 106 from the first hole set of the outer row 100 is at least partially radially aligned with a major air hole 104 from the second hole set of the inner row 102. One intermediate air hole 108 from the first hole set of the outer row 100 is at least partially radially aligned with one intermediate air hole 108 from the second hole set of the inner row 102. A major air hole 104 from the first hole set of the outer row 100 is at least partially radially aligned another intermediate hole 112 from the second hole set of the inner row 102. Another intermediate hole 112 from the first hole set of the outer row 100 is at least partially radially aligned with a minor air hole 106 of the second hole set of the inner row 102.

The holes in each of the rows 100, 102 serve to regulate the quantity of combustion air admitted into the combustion chamber 36. In the four hole pattern, the major air holes 104 are circumferentially positioned proximate to fuel-rich regions or regions of strong swirl approaching the quench row. Placement of the intermediate 108, 112 and minor 106 air holes in the outer 34 and inner 32 liners is managed and prescribed to impact the less prominent fuel/swirl regions while still promoting effective mixing of the pressurized air with the upstream fuel-air mixture and at pressurized air levels that secure the design intent and respective air flow requirements/restrictions. As the local fuel-air distributions and aerodynamics proximate to each liner vary, the patterns of the holes on the inner 32 and outer 34 liners specifically differ and need not be symmetric about a fuel nozzle centerline.

Each repeating pattern of air holes is each circumferentially aligned with one of the fuel injectors 82, projections of which are designated 82' in FIG. 2, which shows a three hole pattern. The major air holes 104 are circular holes, each including a hole in the outer shell 44 and a corresponding hole in the forward outer heatshield 46. As shown in FIG. 3A, a raised rim 120 that is integral with the heatshield 46, circumscribes each major air hole 104 and occupies the radial space between the heatshield 46 and the outer shell 44 so that each major hole 104 is in the form of a short, sealed passage for conveying combustion air from the plenum 42 to the combustion chamber 36. The major air holes 104 in the outer shell 44 are slightly larger than corresponding major air holes 104 in the heatshield 46 to account for manufacturing and assembly inaccuracies that might otherwise result in imperfect registration of the holes and attendant, undesirable restriction of fluid flow through the holes. Owing to their smaller size, any holes in a heatshield, rather than holes in the outer shell 44, regulate the quantity of combustion air admitted into the combustion chamber 36.

The outer liner 34 also includes minor air holes 106, which in the example shown are circular holes, each including a hole in the outer shell 44 and a corresponding hole in the forward outer heatshield 46. A raised rim 122, integral with the heatshield 46, circumscribes each minor air hole 106 and occupies the radial space between the heatshield 46 and the outer shell 44 so that each minor air hole 106 is in the form of a short, sealed passage for conveying combustion air from the plenum 42 to the combustion chamber 36. Although not shown, the intermediate hole 108, which would be positioned to the right of major air hole 104 when viewing FIG. 3A, would be similarly configured to have corresponding holes in the outer shell 44 and heatshield 46, and would include a raised rim as described above. It should also be appreciated that the aft outer heatshield 48 also includes corresponding holes.

It should be appreciated that the inner row 102 of holes in the inner liner 32 would be similarly configured as those described above with regard to the outer row 100 of holes for the outer liner 34. Examples of hole sizes are as follows: the minor air holes could be as small as 0.125 inches (3.18 mm) in diameter but in most examples would range within 0.250 inches (6.35 mm) to 0.300 inches (7.62 mm); the major air holes can be as large as 1.500 inches (38.1 mm) but in most examples would range within 0.600 inches (15.2 mm) to 0.750 inches (19.1 mm) in diameter; and the intermediate holes will fall somewhere between the major air hole sizes and minor air hole sizes depending upon specific applications.

It should be appreciated that the inner and outer hole diameters need not be of absolute or relative diameters as described in aforementioned sections. Other patterns of differing count or of a non-repeating nature could also be used. As known, fuel-air distributions and aerodynamics in combustors lack perfect repeatability. Moreover, front-end patterns in combustors may be mapped, simulated, or modeled. Therefore, it may be advantageous that the alignment with fuel nozzles, hole patterns, sizes and number on one liner or both liners, different other than that disclosed above.

The inner and outer rows 102, 100 of combustion air holes are approximately axially aligned with each other and penetrate their respective liners 32, 34 between 10% and 90% of the axial length L of the liner assembly. In the illustrated examples, each row 102, 100 penetrates its respective liner at about midway along the axial length L of the liner assembly, which corresponds to a location proximate the leading edge of each aft heatshield 46, 60. The rows 100, 102 of holes divide the combustion chamber into three combustion zones including a rich burn zone RB axially forward of the holes, a dilution or quench zone Q axially coincident with the holes, and a lean burn zone LB axially aft of the holes.

During engine operation, the diffuser 12 decelerates pressurized air flowing from the compressor. A first portion of the pressurized air enters the combustor 26 by way of the impingement and film cooling holes 70, 72 to cool the heatshields 46, 48, 60, 62 and by way of the cooling holes to cool the bulkhead assembly 80. A second portion of the pressurized air enters the rich burn zone RB of the combustion chamber 36 by way of various passages in the front end assembly 76. The pressurized air is referred to as primary combustion air because it intermixes with a stoichiometrically excessive quantity of fuel introduced through the fuel injectors 82 to support initial combustion in the rich burn zone RB. The rich stoichiometry of the fuel-air mixture in the rich burn zone produces a relatively cool flame, thus facilitates preventing excessive $NO_X$ formation and guarding against blowout of the combustion flame during any abrupt reduction in engine power. The front end assembly 76 is the dominant vehicle for introducing primary combustion air into the combustion chamber 36. In comparison, introducing the primary air elsewhere, e.g. through combustion air openings in the forward end of the inner 32 and outer 34 liners, would provoke excessive $NO_X$ formation by producing stoichiometrically or nearly stoichiometrically proportioned pockets of fuel and air in the forward end of the combustion chamber.

The combustion products from the rich burn zone RB, which include unburned fuel, then enter the quench zone Q. A third portion of the pressurized air from the compressor flows from plenums 40, 42 and into the quench zone Q through the rows 100, 102 of combustion air holes. This third portion of pressurized air is referred to as dilution air because it facilitates diluting or deriching the combustion products from their stoichiometrically rich state at the forward edge of the quench zone Q to a stoichiometrically lean state at or just downstream of the aft edge of the quench zone Q. Intimately mixing dilution air with the combustion products flowing through the combustion chamber allows the fuel-air mixture to quickly become both thoroughly blended and regularly distributed. As used herein, the term "regular" refers to a state in which the fuel-air ratio is substantially uniform in the circumferential direction (at any arbitrarily specified radius) and in which the radial distribution of fuel-air ratio is either uniform or varies in a desired, pre-established way.

The air holes set forth in the described examples are specified as having different diameters and orientation to match the approaching flow and/or fuel-air mixture from the primary or rich burn zone RB and to optimize the quench process. The penetration depth of the dilution air and the corresponding quantity of pressurized air admitted through the holes may be regulated by specifying the relative sizes of the holes since the penetration depth of the jets and the fluid admission capacity of the holes both increase with increasing hole size. As a result, different combustion chamber designs are able to adjust to the temperature profile of the combustion gases by adjusting the size of the large holes, without compromising fuel-air mixing, which could lead to elevated levels of $NO_X$.

The combustion products from the quench zone Q then enter the lean burn zone LB where the combustion process concludes. As the combustion products flow into the lean burn zone LB, the air jets are not only swept downstream, but also continue to penetrate radially and spread out laterally and intermix thoroughly with the combustion gases. Evaluations using sophisticated computational fluid dynamics (CFD) techniques have shown the efficacy of the combustor.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. A combustor for a turbine engine comprising:
    an outer liner having a row of circumferentially distributed outer combustion air holes including at least a major outer air hole having a first outer air hole size, an intermediate outer air hole having a second outer air hole size, and a minor outer air hole having a third outer air hole size, wherein said first, said second, and said third outer air hole sizes are all different from each other;
    an inner liner circumscribed by said outer liner and having a row of circumferentially distributed inner combustion air holes including at least a major inner air hole having a first inner air hole size, an intermediate inner air hole having a second inner air hole size, and a minor inner air hole having a third inner air hole size, wherein said first, said second, and said third inner air hole sizes are all different from each other; and
    wherein said circumferentially distributed outer combustion air holes are radially aligned with said circumferentially distributed inner combustion air holes such that at least one of said major outer, intermediate outer, and minor air holes is aligned with a different hole size of said major inner, intermediate inner, and minor inner air holes.

2. The combustor according to claim 1 wherein said second outer and said second inner air hole sizes are smaller than said first outer and said first inner air hole sizes, and wherein said second outer and said second inner air hole sizes are greater than said third outer and said third inner air hole sizes.

3. The combustor according to claim 2 wherein said intermediate air holes are positioned circumferentially between said major air holes and said minor air holes.

4. The combustor according to claim 3 wherein said row of circumferentially distributed outer combustion air holes is comprised of a plurality of first hole sets, each first hole set including at least one minor air hole that is circumferentially spaced from one intermediate air hole that in turn is circumferentially spaced from one major air hole, and wherein each minor hole of one first hole set is circumferentially spaced from a major air hole of an immediately adjacent first hole set, and wherein said row of circumferentially distributed inner combustion air holes is comprised of a plurality of second hole sets, each second hole set including at least one minor air hole that is circumferentially spaced from one intermediate air hole that is circumferentially spaced from one major air hole, and wherein each minor hole of one second hole set is circumferentially spaced from a major air hole of an immediately adjacent second hole set.

5. A combustor for a turbine engine comprising:
    an outer liner having a row of circumferentially distributed outer combustion air holes including at least a major outer air hole having a first outer air hole size, an intermediate outer air hole having a second outer air hole size, and a minor outer air hole having a third outer air hole size, wherein said first, said second, and said third outer air hole sizes are all different from each other;
    an inner liner circumscribed by said outer liner and having a row of circumferentially distributed inner combustion air holes including at least a major inner air hole having a first inner air hole size, an intermediate inner air hole having a second inner air hole size, and a minor inner air hole having a third inner air hole size, wherein said first, said second, and said third inner air hole sizes are all different from each other;
    wherein said second outer and said second inner air hole sizes are smaller than said first outer and said first inner air hole sizes, and wherein said second outer and said second inner air hole sizes are greater than said third outer and said third inner air hole sizes;
    wherein said intermediate air holes are positioned circumferentially between said major air holes and said minor air holes;
    wherein said row of circumferentially distributed outer combustion air holes is comprised of a plurality of first hole sets, each first hole set including at least one minor air hole that is circumferentially spaced from one intermediate air hole that in turn is circumferentially spaced from one major air hole, and wherein each minor hole of one first hole set is circumferentially spaced from a major air hole of an immediately adjacent first hole set, and wherein said row of circumferentially distributed inner combustion air holes is comprised of a plurality of second hole sets, each second hole set including at least one minor air hole that is circumferentially spaced from one intermediate air hole that is circumferentially spaced from one major air hole, and wherein each minor hole of one second hole set is circumferentially spaced from a major air hole of an immediately adjacent second hole set; and
    wherein a minor air hole from said first hole set is at least partially aligned in a radial direction with a major air hole from said second hole set, an intermediate air hole from said first hole set is at least partially aligned in a radial direction with an intermediate air hole from said second hole set, and a major air hole from said first hole set is at least partially aligned in a radial direction with a minor air hole from said second hole set.

6. A combustor for a turbine engine comprising:
    an outer liner having a row of circumferentially distributed outer combustion air holes including at least a major outer air hole having a first outer air hole size, an intermediate outer air hole having a second outer air hole size, and a minor outer air hole having a third outer air hole size, wherein said first, said second, and said third outer air hole sizes are all different from each other;
    an inner liner circumscribed by said outer liner and having a row of circumferentially distributed inner combustion air holes including at least a major inner air hole having a first inner air hole size, an intermediate inner air hole having a second inner air hole size, and a minor inner air hole having a third inner air hole size, wherein said first, said second, and said third inner air hole sizes are all different from each other;
    wherein said second outer and said second inner air hole sizes are smaller than said first outer and said first inner air hole sizes, and wherein said second outer and said second inner air hole sizes are greater than said third outer and said third inner air hole sizes;

wherein said intermediate air holes are positioned circumferentially between said major air holes and said minor air holes;

wherein said row of circumferentially distributed outer combustion air holes is comprised of a plurality of first hole sets, each first hole set including at least one minor air hole that is circumferentially spaced from one intermediate air hole that in turn is circumferentially spaced from one major air hole, and wherein each minor hole of one first hole set is circumferentially spaced from a major air hole of an immediately adjacent first hole set, and wherein said row of circumferentially distributed inner combustion air holes is comprised of a plurality of second hole sets, each second hole set including at least one minor air hole that is circumferentially spaced from one intermediate air hole that is circumferentially spaced from one major air hole, and wherein each minor hole of one second hole set is circumferentially spaced from a major air hole of an immediately adjacent second hole set; and wherein said major air hole from said first hole set is at least partially aligned in a radial direction with an intermediate air hole from said second hole set, an intermediate air hole from said first hole set is at least partially aligned in a radial direction with a major air hole from said second hole set, and a minor air hole from said first hole set is offset from a minor air hole from said second hole set with said intermediate and major air holes of said first and said second hole sets being positioned circumferentially between said minor air holes of said first and said second hole sets.

7. The combustor according to claim 2 including a fourth outer air hole having a fourth outer air hole size and a fourth inner air hole having a fourth inner air hole size, said fourth outer and said fourth inner air holes corresponding to one of a major air hole, a minor air hole, or an intermediate air hole.

8. The combustor according to claim 7 wherein at least one of said intermediate air holes is positioned circumferentially between said major air holes and said minor air holes.

9. A combustor for a turbine engine comprising:
an outer liner having a row of circumferentially distributed outer combustion air holes including at least a major outer air hole having a first outer air hole size, an intermediate outer air hole having a second outer air hole size, and a minor outer air hole having a third outer air hole size, wherein said first, said second, and said third outer air hole sizes are all different from each other;
an inner liner circumscribed by said outer liner and having a row of circumferentially distributed inner combustion air holes including at least a major inner air hole having a first inner air hole size, an intermediate inner air hole having a second inner air hole size, and a minor inner air hole having a third inner air hole size, wherein said first, said second, and said third inner air hole sizes are all different from each other;
wherein said second outer and said second inner air hole sizes are smaller than said first outer and said first inner air hole sizes, and wherein said second outer and said second inner air hole sizes are greater than said third outer and said third inner air hole sizes;
a fourth outer air hole having a fourth outer air hole size and a fourth inner air hole having a fourth inner air hole size, said fourth outer and said fourth inner air holes corresponding to one of a major air hole, a minor air hole, or an intermediate air hole; and
wherein said row of circumferentially distributed outer combustion air holes is comprised of a plurality of first hole sets, each first hole set including at least one minor air hole that is circumferentially spaced from one intermediate air hole that in turn is circumferentially spaced from one major air hole that in turn is circumferentially spaced from another intermediate air hole, and wherein each minor hole of one first hole set is circumferentially spaced from one intermediate air hole of an immediately adjacent first hole set, and wherein said row of circumferentially distributed inner combustion air holes is comprised of a plurality of second hole sets, each second hole set including at least one minor air hole that is circumferentially spaced from one intermediate air hole that in turn is circumferentially spaced from another intermediate air hole that in turn is circumferentially spaced from one major air hole, and wherein each minor hole of one second hole set is circumferentially spaced from a major air hole of an immediately adjacent second hole set.

10. The combustor according to claim 9 wherein a minor air hole from said first hole set is at least partially aligned in a radial direction with a major air hole from said second hole set, a first intermediate air hole from said first hole set is at least partially in a radial direction aligned with a first intermediate air hole from said second hole set, a major air hole from said first hole set is at least partially aligned in a radial direction with a second intermediate hole from said second hole set, and a second intermediate hole from said first hole set is at least partially aligned in a radial direction with a minor air hole of said second hole set.

11. The combustor assembly according to claim 7 wherein said fourth outer and said fourth inner air holes each comprise intermediate air holes that are larger than said minor air holes and smaller than said major air holes.

12. The combustor according to claim 1 wherein each of said inner and said outer liners comprise a support shell, and including a forward heatshield secured to a forward portion of each support shell and an aft heatshield secured to an aft portion of each support shell.

13. The combustor according to claim 12 including a plurality of impingement cooling holes in each support shell and a plurality of film cooling holes in each heatshield.

14. The combustor according to claim 1 including a combustor front end structure to introduce primary combustion air into a combustion chamber.

15. The combustor according to claim 1 wherein said major outer air hole is at least partially radially aligned with one of said intermediate or minor inner air holes.

16. The combustor according to claim 15 wherein said second outer and said second inner air hole sizes are smaller than said first outer and said first inner air hole sizes, and wherein said second outer and said second inner air hole sizes are greater than said third outer and said third inner air hole sizes.

17. The combustor according to claim 1 wherein said outer liner only includes a single row of circumferentially distributed outer combustion air holes and wherein said inner liner only includes a single row of circumferentially distributed inner combustion air holes that are radially aligned with said single row of circumferentially distributed outer combustion air holes.

18. The combustor according to claim 1 wherein at least one of said inner or outer combustion air holes is not radially aligned with any other combustion air hole.

19. The combustor according to claim 1 at least one of said major outer, intermediate outer, and minor outer air holes is offset from being radially aligned with any of said major inner, intermediate inner, and minor inner air holes.

* * * * *